United States Patent
Meng et al.

(10) Patent No.: US 10,999,071 B2
(45) Date of Patent: May 4, 2021

(54) METHOD, APPARATUS, AND CLOUD SYSTEM FOR EXECUTING AN APPLICATION IN A CLOUD SYSTEM

(71) Applicant: Siemens Aktiengesellschaft, Munich (DE)

(72) Inventors: Xian Tao Meng, Langfang (CN); Bin Zhang, Beijing (CN); Ming Jie, Beijing (CN); Armin Roux, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 174 days.

(21) Appl. No.: 16/034,460

(22) Filed: Jul. 13, 2018

(65) Prior Publication Data

US 2019/0103967 A1 Apr. 4, 2019

(30) Foreign Application Priority Data

Sep. 29, 2017 (CN) .......................... 201710912442.7

(51) Int. Cl.
*H04L 29/06* (2006.01)
*H04L 9/30* (2006.01)
(Continued)

(52) U.S. Cl.
CPC ............ *H04L 9/3073* (2013.01); *G06F 21/31* (2013.01); *G06F 21/62* (2013.01); *G06F 21/64* (2013.01);
(Continued)

(58) Field of Classification Search
CPC ....... H04L 9/3073; H04L 9/0637; H04L 9/14; H04L 9/3242; H04L 9/3247; H04L 63/08;
(Continued)

(56) References Cited

U.S. PATENT DOCUMENTS 6,289,453 B1 * 9/2001 Walker .................. G06Q 50/06
713/175
7,565,322 B1 * 7/2009 Feldman .................. G06F 21/10
705/50

(Continued)

FOREIGN PATENT DOCUMENTS

CN 103198030 A 7/2013
CN 103617404 A 3/2014
(Continued)

OTHER PUBLICATIONS

Extended European Search Report dated Nov. 30, 2018.
Office Action dated Nov. 4, 2020 in Chinese Application No. 201710912442.7.

*Primary Examiner* — John B King
(74) *Attorney, Agent, or Firm* — Harness, Dickey & Pierce, P.L.C.

(57) ABSTRACT

A method is for executing an application in a cloud system. The method includes receiving a request from a first user for executing an application in the cloud system; receiving, from the first user, user data of the first user related to the execution of the requested application; storing the received user data in a first storage area of a computing environment of the cloud system; in the computing environment, executing the requested application based on the stored user data of the first user to obtain an execution result; and storing the execution result in a second storage area of the computing environment, the access permission of the first user to the first storage area being a write-only permission, and the access permission of the first user to the second storage area being a read-only permission. As such, data privacy protection and security can be provided in the cloud system.

31 Claims, 15 Drawing Sheets

(51) Int. Cl.
  *G06F 21/64*  (2013.01)
  *G06F 21/62*  (2013.01)
  *G06F 21/31*  (2013.01)
  *H04L 9/06*   (2006.01)
  *H04L 9/14*   (2006.01)
  *H04L 9/32*   (2006.01)
  *H04L 29/08*  (2006.01)

(52) U.S. Cl.
  CPC .............. *H04L 9/0637* (2013.01); *H04L 9/14* (2013.01); *H04L 9/3242* (2013.01); *H04L 9/3247* (2013.01); *H04L 63/08* (2013.01); *H04L 63/102* (2013.01); *H04L 67/1097* (2013.01); *H04L 67/32* (2013.01)

(58) Field of Classification Search
  CPC ... H04L 63/102; H04L 67/1097; H04L 67/32; H04L 63/0807; H04L 63/083; H04L 63/0876; H04L 63/10; H04L 67/34; G06F 21/64; G06F 21/62; G06F 21/31
  See application file for complete search history.

(56) References Cited

U.S. PATENT DOCUMENTS

| | | | |
|---|---|---|---|
| 2007/0078677 A1* | 4/2007 | Hofstetter | G06Q 50/22 705/2 |
| 2009/0187772 A1* | 7/2009 | Lange | H04W 12/06 713/193 |
| 2014/0137265 A1 | 5/2014 | Dubman | |
| 2014/0181512 A1 | 6/2014 | Spalka et al. | |
| 2014/0181521 A1* | 6/2014 | Hemphill | H04L 9/0819 713/171 |
| 2015/0281233 A1 | 10/2015 | Asenjo et al. | |
| 2016/0283941 A1* | 9/2016 | Andrade | H04L 9/3247 |
| 2017/0012945 A1* | 1/2017 | Poffenbarger | H04L 63/0428 |
| 2017/0230353 A1 | 8/2017 | Kurian et al. | |
| 2018/0227119 A1* | 8/2018 | Bibera | H04L 63/083 |
| 2018/0365952 A1* | 12/2018 | De Las Heras Villalon | G06K 7/1417 |

FOREIGN PATENT DOCUMENTS

| | | |
|---|---|---|
| CN | 106228092 A | 12/2016 |
| EP | 0956677 A1 | 11/1999 |
| EP | 2924569 A2 | 9/2015 |

\* cited by examiner

United States Patent US 10,999,071 B2

METHOD, APPARATUS, AND CLOUD SYSTEM FOR EXECUTING AN APPLICATION IN A CLOUD SYSTEM

PRIORITY STATEMENT

The present application hereby claims priority under 35 U.S.C. § 119 to Chinese patent application number CN 201710912442.7 filed Sep. 29, 2017, the entire contents of which are hereby incorporated herein by reference.

FIELD

At least one embodiment of the present application generally relates to the field of cloud computing and, more particularly, to a method, apparatus, and cloud system for executing an application in a cloud system.

BACKGROUND

In recent years, the development of cloud platforms has become faster and faster; especially, industrial clouds are being applied to more and more fields. A large number of companies, organizations, and users often connect to industrial clouds, and they are using vast amounts of data, algorithms, and applications that are valuable data assets.

When a user connects to an industrial cloud and uses an application on the industrial cloud, on the one hand, the user needs the applications on the industrial cloud and valuable data of other users; on the other hand, the user also needs to protect his/her own private valuable data against malicious access. This is a dilemma and has become an obstacle to the widespread use of industrial clouds.

SUMMARY

The inventors have recognized that how to provide data privacy protection and security more effectively on industrial clouds has become a problem that needs to be solved.

In view of the above-mentioned problem, the present application provides embodiments of a method, apparatus, and cloud system for executing an application in a cloud system. With the method, a first storage area that is read-only for a user and a second storage area that is write-only for the user are created in a computing environment of the cloud system, after receipt of the user's request for an application in the cloud system, the data submitted by the user is loaded into the first storage area to execute the requested application based on the user data in the computing environment, and the execution result is stored in the second storage area for the user to obtain, so that data privacy protection and security can be provided on the cloud system.

According to one embodiment of the present disclosure, there is provided a method for executing an application in a cloud system, characterized in that, the method comprises: receiving a request from a first user for executing an application in the cloud system; receiving, from the first user, user data of the first user related to the execution of the requested application; storing the received user data in a first storage area of a computing environment of the cloud system; in the computing environment, executing the requested application based on the stored user data of the first user to obtain an execution result; and storing the execution result in a second storage area of the computing environment, wherein the access permission of the first user to the first storage area is a write-only permission, and the access permission of the first user to the second storage area is a read-only permission.

According to another embodiment of the present application, an apparatus for executing an application in a cloud system is provided, characterized in that, the apparatus comprises: an application request receiving unit for receiving a request from a first user for executing an application in the cloud system; a user data receiving unit for receiving, from the first user, user data of the first user related to the execution of the requested application; a user data storage unit for storing the received user data in a first storage area of a computing environment of the cloud system; an execution unit for, in the computing environment, executing the requested application based on the stored user data of the first user to obtain an execution result; an execution result storage unit for storing the execution result in a second storage area of the computing environment, wherein the access permission of the first user to the first storage area is a write-only permission, and the access permission of the first user to the second storage area is a read-only permission.

According to another embodiment of the present application, there is provided a computing device comprising: one or more processors; a memory for storing instructions that, when executed by the one or more processors, cause the one or more processors to perform an embodiment of the above-mentioned method applied in the cloud system.

According to another embodiment of the present application, a cloud system is provided, comprising: a computing environment comprising a first storage area for storing user data input by a user and a second storage area for storing an execution result of the application, wherein the access permission of the user to the first storage area is a write-only permission, and the access permission of the user to the second storage area is a read-only permission, and an apparatus for executing an application in an embodiment of a cloud system as described above.

BRIEF DESCRIPTION OF THE DRAWINGS

A further understanding of the nature and advantages of the present disclosure can be realized by referring to the accompanying drawings. In the drawings, similar components or features may have the same reference numerals.

REFERENCE NUMERALS

Figure 1:
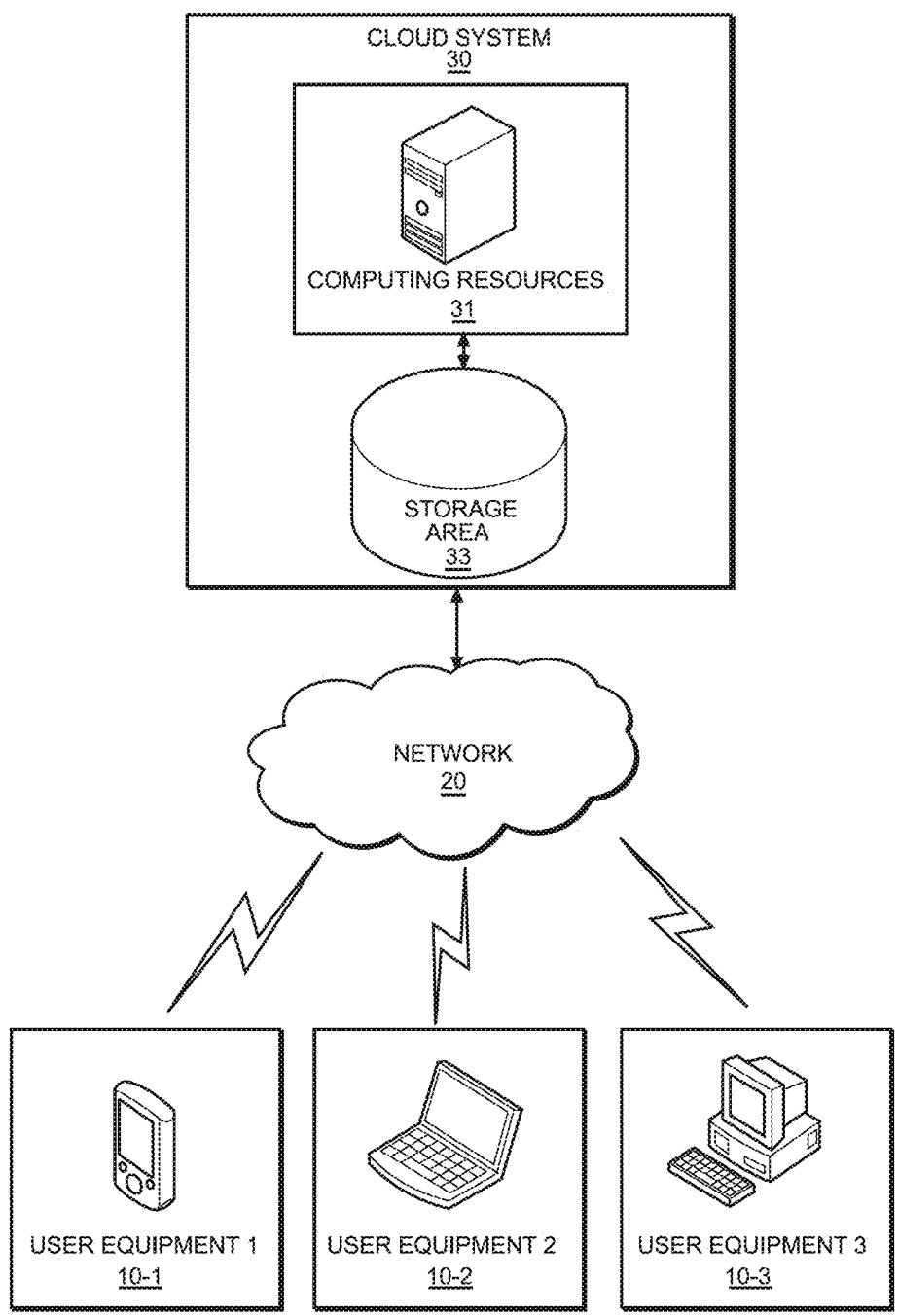
FIG. 1 shows a schematic diagram of the architecture of a cloud system.

10-1, 10-2, 10-3: User equipment—1, User equipment—2, User equipment—3
20: Network
30: Cloud system
31: Computing resources
33: Storage area
40: Computing environment
41: First storage area
42: Apparatus for executing an application in a cloud system
43: Second storage area
421: Application request receiving unit
422: User data receiving unit
423: User data storage unit
424: Execution unit
425: Execution result storage unit
426: User identity obtaining unit
427: Key obtaining unit
428: Key storage unit
429: Decryption unit
50: Access control unit
60: Data keystore
61-1/61-N: Data public key
62: Data encryption key
310: The first user sends a request for the application.
315: Access control check for the first user?
317: Send a message indicating that the access control check has been passed.
319: Encrypt user data of the first user.
320: Upload user data of the first user.
320': Upload encrypted user data of the first user.
321: Is data from the second user required?
323: Send a request for obtaining data of the second user.
325: Authorize and authenticate the first user for data usage.
326: Encrypt user data of the second user.
327: Upload user data of the second user
327': Upload encrypted user data of the second user.
330: Store user data in the first storage area.
333: Obtain a public key.
335: Decrypt user data of the first user and the second user.
340: Execute the application.
350: Store an execution result.
355: Obtain an execution result.
360: Erase the computing environment.
1000: User-side data
1010: Access control key
1020: Data private key
1030: Private data
1200: Message
1210: Encrypted address of the first user
1220: Public key of the first user
1230: Private key signature on the first user's blockchain
1240: Encrypted address of the second user
100: Computing environment
1310: Access control
1311: User's encrypted data
1312: User's decrypted data
1312: Execution result
1312: Encrypted execution result

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to one embodiment of the present disclosure, there is provided a method for executing an application in a cloud system, characterized in that, the method comprises: receiving a request from a first user for executing an application in the cloud system; receiving, from the first user, user data of the first user related to the execution of the requested application; storing the received user data in a first storage area of a computing environment of the cloud system; in the computing environment, executing the requested application based on the stored user data of the first user to obtain an execution result; and storing the execution result in a second storage area of the computing environment, wherein the access permission of the first user to the first storage area is a write-only permission, and the access permission of the first user to the second storage area is a read-only permission.

Preferably, in an example of the above-mentioned embodiment, the method may further comprise: erasing data stored in the first storage area and the second storage area after the execution result is obtained by the first user.

Preferably, in an example of the above-mentioned embodiment, the method may further comprise: upon receiving the request from the first user for an application in the cloud system, receiving, from the first user, an access control key of the first user; performing an access control check on the first user by using the access control key of the first user, wherein, after the access control check on the first user is passed, user data of the first user related to the execution of the application is received from the first user.

Preferably, in an example of the foregoing embodiment, the method may further comprise: determining whether the execution of the application requires user data of a second user different from the first user, wherein the access permission of the second user to the first storage area is a write-only permission, and the access permission of the second user to the second storage area is a read-only permission; and, when it is determined that the execution of the application requires user data of the second user, receiving user data of the second user from the second user, and storing the received user data of the second user in the first storage area.

Preferably, in an example of the above-mentioned embodiment, determining whether the execution of the application requires user data of the second user may comprise: determining whether the execution of the application requires user data of the second user based on attribute information of the application.

Preferably, in an example of the above embodiment, the method may further comprise: the second user performing authorization and authentication on the first user for data usage using an authorization and authentication message from the first user and, after the authorization and authentication for the first user performed by the second user is passed, receiving the user data of the second user from the second user.

Preferably, in an example of the above-mentioned embodiment, the authorization and authentication message comprises an encrypted address of the first user, a public key, a private key signature on a blockchain of the first user, and an encrypted address of the second user, wherein the step of the second user performing authorization and authentication on the first user for data usage using an authorization and authentication message from the first user comprises: the second user calculating an encrypted address of the first user by using a public key of the first user in the authorization and authentication message, and comparing the calculated encrypted address with the encrypted address of the first user contained in the authorization and authentication message to check whether they are the same; the second user decrypting the private key signature on a blockchain of the first user using the public key of the first user in the authorization and authentication message, and comparing the decrypted private key signature with the hash value of the last block on a blockchain of the second user to check whether they are the same; and, when the calculated encrypted address is the same as the encrypted address of the first user contained in the authorization and authentication message and the decrypted private key signature is the same as the hash value of the last block on the blockchain of the second user, confirming that the authorization and authentication on the first user for data usage has been passed.

Preferably, in an example of the above-mentioned embodiment, the message is sent from the first user to the second user in broadcast manner, or the message is sent from the first user via the cloud system to the second user.

Preferably, in an example of the above-mentioned embodiment, user data of the first user related to the execution of the application is data encrypted by the first user with a private key in a private key/public key pair of the first user, and the public key of the first user is stored in a data keystore of the cloud system in association with a user identity of the first user, and the method can further comprise: obtaining a user identity of the first user from the first user; obtaining, from the data keystore, a public key in a private key/public key pair of the first user corresponding to the obtained user identity of the first user; storing an obtained public key of the first user in a third storage area of the computing environment; and, in the computing environment, decrypting the received encrypted user data of the first user using the public key of first user stored in the third storage area.

Preferably, in an example of the above-mentioned embodiment, user data of the first user related to the execution of the application is data encrypted by the first user with a private key in a private key/public key pair of the first user, user data of the second user related to the execution of the application is data encrypted by the second user with a private key in a private key/public key pair of the second user, and the public key of the first user is stored in a data keystore of the cloud system in association with a user identity of the first user, the public key of the second user is stored in the data key store of the cloud system in association with the user identity of the second user, and the method further comprises: obtaining a user identity of the first user and a user identity of the second user from the first user; obtaining, from the data keystore, a public key in a private key/public key pair of the first user corresponding to the obtained user identity of the first user, and obtaining, from the data keystore, a public key in a private key/public key pair of the second user corresponding to the obtained user identity of the second user; storing the obtained public key of the first user and the public key of the second user in a third storage area of the computing environment; and, in the computing environment, decrypting the received encrypted user data of the first user and the encrypted user data of the second user by using a public key of the first user and a public key of the second user stored in the third storage area.

Preferably, in one example of the above-mentioned embodiment, the method may further comprise: storing a data encryption key in the data keystore of the cloud system in a fourth storage area of the computing environment; in the computing environment, encrypting the execution result using the data encryption key stored in the fourth storage area before storing the execution result in the second storage area.

Preferably, in an example of the above-mentioned embodiment, the method may further comprise: sending the execution result to the first user in push manner or in a manner requested by a user.

According to another embodiment of the present application, an apparatus for executing an application in a cloud system is provided, characterized in that, the apparatus comprises: an application request receiving unit for receiving a request from a first user for executing an application in the cloud system; a user data receiving unit for receiving, from the first user, user data of the first user related to the execution of the requested application; a user data storage unit for storing the received user data in a first storage area of a computing environment of the cloud system; an execution unit for, in the computing environment, executing the requested application based on the stored user data of the first user to obtain an execution result; an execution result storage unit for storing the execution result in a second storage area of the computing environment, wherein the access permission of the first user to the first storage area is a write-only permission, and the access permission of the first user to the second storage area is a read-only permission.

Preferably, in an example of the above-mentioned embodiment, the apparatus may further comprise: an erasing unit for erasing data stored in the first storage area and the second storage area after the execution result is obtained by the first user.

Preferably, in an example of the above-mentioned embodiment, the apparatus may further comprise: an access control key receiving unit for, upon receiving the request from the first user for an application in the cloud system, receiving, from the first user, an access control key of the first user; and, an access control unit for performing an access control check on the first user using the access control key of the first user, wherein, after the access control check on the first user is passed, the user data receiving unit receives, from the first user, user data of the first user related to the execution of the application.

Preferably, in an example of the above-mentioned embodiment, the apparatus can further comprise: a determining unit for determining whether the execution of the application requires user data of a second user, wherein the access permission of the second user to the first storage area is a write-only permission, and the access permission of the second user to the second storage area is a read-only permission; when it is determined that the execution of the application requires user data of the second user, the user data receiving unit receives user data of the second user from the second user, and the user data storage unit stores the received user data of the second user in the first storage area.

Preferably, in an example of the above-mentioned embodiment, the determining unit is configured to determine whether the execution of the application requires user data of the second user based on attribute information of the application.

Preferably, in an example of the above-mentioned embodiment, user data of the first user related to the execution of the application is data encrypted by the first user with a private key in a private key/public key pair of the first user, and the apparatus may further comprise: a data keystore for storing a public key in a private key/public key pair of the first user in association with a user identity of the first user; a user identity obtaining unit for obtaining a user identity of the first user from the first user; a key obtaining unit for obtaining, from the data keystore, a public key in a private key/public key pair of the first user corresponding to the obtained user identity of the first user; a key storage unit for storing the obtained public key of the first user and the public key of the second user in a third storage area of the computing environment; and, a decryption unit for decrypting the received encrypted user data of the first user using the public key of the first user stored in the third storage area.

Preferably, in an example of the above-mentioned embodiment, user data of the first user related to the execution of the application is data encrypted by the first user with a private key in a private key/public key pair of the first user, user data of the second user related to the execution of the application is data encrypted by the second user with a private key in a private key/public key pair of the second user, and the apparatus further comprises: a data keystore for storing a public key in a private key/public key pair of the first user in association with a user identity of the first user; and storing a public key in a private key/public key pair of the second user in association with a user identity of the second user; a user identity obtaining unit for obtaining the user identity of the first user and second user from the first user; a key obtaining unit for obtaining, from the data keystore, a public key in a private key/public key pair of the first user corresponding to the obtained user identity of the first user, and obtaining, from the data keystore, a public key in a private key/public key pair of the second user corresponding to the obtained user identity of the second user; a key storage unit for storing the obtained public key of the first user and the public key of the second user in a third storage area of the computing environment; and a decryption unit for, in the computing environment, decrypting the received encrypted user data of the first user and the encrypted user data of the second user by using a public key of the first user and a public key of the second user stored in the third storage area.

Preferably, in an example of the above-mentioned embodiment, the data keystore comprises a data encryption key, the key storage unit is further used for storing the data encryption key in the data keystore in a fourth storage area of the computing environment, and the apparatus may further comprise: an encryption unit for, in the computing environment, encrypting the execution result using the data encryption key stored in the fourth storage area before storing the execution result in the second storage area.

Preferably, in an example of the above-mentioned embodiment, the apparatus may further comprise: a sending unit for sending the execution result to the first user in a push manner or in a manner requested by a user.

According to another embodiment of the present application, there is provided a computing device comprising: one or more processors; a memory for storing instructions that, when executed by the one or more processors, cause the one or more processors to perform an embodiment of the above-mentioned method applied in the cloud system.

According to another embodiment of the present application, a cloud system is provided, comprising: a computing environment comprising a first storage area for storing user data input by a user and a second storage area for storing an execution result of the application, wherein the access permission of the user to the first storage area is a write-only permission, and the access permission of the user to the second storage area is a read-only permission, and an apparatus for executing an application in an embodiment of a cloud system as described above.

With a method, apparatus, and cloud system for executing an application in a cloud system according to an embodiment of the present application, a first storage area that is read-only for a user and a second storage area that is write-only for the user are created in a computing environment of the cloud system, after receipt of the user's request for an application in the cloud system, the data submitted by the user is loaded into the first storage area to execute the requested application based on the user data in the computing environment, and the execution result is stored in the second storage area for the user to obtain, so that data privacy protection and security can be provided on the cloud system.

With a method, apparatus, and cloud system for executing an application in a cloud system according to an embodiment of the present application, after the execution result of the application request for the first user is obtained by the first user, data stored in the first and second storage areas are erased to prevent data related to the execution of the application from being obtained by any other user, thereby more effectively providing data privacy protection and security.

With a method, apparatus, and cloud system for executing an application in a cloud system according to an embodiment of the present application, before the first and/or second user submits their own user data to a computing environment, an access control check is performed for the first user to prevent an unauthorized user from submitting malicious data to the computing environment, thereby more effectively providing data privacy protection and security.

With a method, apparatus, and cloud system for executing an application in a cloud system according to an embodiment of the present application, the execution result is encrypted using the data encryption key in the data keystore before the execution result is obtained by the first user; thus, a user without the data encryption key cannot be informed of the execution result, and data privacy protection and security can be provided more effectively.

The subject matter described herein will now be discussed with reference to exemplary embodiments. It should be understood that these embodiments are discussed only to enable those of ordinary skill in the art to better understand the subject matter described herein, but not intended to limit the scope, applicability or examples set forth in the claims. Variations in the function and arrangement of the elements discussed can be made without departing from the scope of the disclosure. In each example, various processes or components may be omitted, substituted, or added as needed. For example, the methods described may be performed in a different order than that described, and the various steps may be added, omitted or combined. Additionally, features described with respect to some examples may also be combined in other examples.

As used herein, the term "comprise" and its variants represent open terms, meaning "including but not limited to". The term "based on" means "based at least in part on". The terms and "one embodiment" and "an embodiment" mean "at least one embodiment". The term "another embodiment" means "at least one other embodiment". The terms "first," "second," and the like may refer to different or identical objects. Other definitions may be included below, whether explicit or implicit. The definition of a term is consistent throughout the Specification unless explicitly otherwise indicated in the context.

Embodiments of the method, apparatus, and cloud system for executing an application in a cloud system of the present application will now be described with reference to the accompanying drawings.

FIG. 1 shows a schematic diagram of the structure of the architecture of a cloud system. As shown in FIG. 1, the cloud system 30 comprises a computing resource 31 and a storage area 33. The computing resource 31 refers to a processing resource, such as a processor, a server, or the like, for executing applications and other processing tasks on the cloud system. The computing resource 31 may comprise one or more processing resources. In addition, in a case where the computing resource 31 comprises a plurality of processing resources, the application to be executed or other processing tasks may be distributed on a plurality of processing resources for processing. The storage area 33 may comprise a data storage area and a program storage area. The data storage area is for storing user data input from the outside and processing results of the calculation resource 31. The program store area is used to store applications on the cloud system. The storage area 33 may comprise various types of volatile memory or nonvolatile memory. Examples of volatile memory may include a buffer, a cache, and the like. Examples of non-volatile memory may include random access memory (RAM), read-only memory (ROM), programmable ROM (PROM), erasable PROM (EPROM), electrically erasable PROM (EEPROM), and registers. Likewise, the storage area 33 may comprise one or more storage areas. In the case where the storage area 33 comprises a plurality of storage areas, the data to be processed may be stored in a plurality of storage areas in a distributed manner.

When the cloud system with the architecture shown in FIG. 1 is running, the cloud system 30, via the network 20, receives a request for executing an application on the cloud system 30 and user data from the user device 10, and stores user data from the user device 10 in the storage area 33. Then, the computing resource 31 obtains user data of other users required to execute the application and stores it in the storage area 33, executes the application requested by the user 10 using the user data of the user 10 in the storage area 33 and the user data of other users to obtain an execution result, and then stores the execution result in the storage area 33. The user 10 can obtain the execution result from the cloud system by way of active acquisition or passive reception. Here, the user device 10 may comprise various types of devices capable of communicating via a network, such as a wired device and a wireless device. Examples of the user device 10 may include a mobile terminal, a notebook computer, a personal computer, a personal digital assistant (PDA), and a netbook. The network 20 can comprise a wired network and a wireless network. Examples of wired networks may include cable television networks and light communication networks. Examples of wireless networks may include, for example, wireless communication networks such as GPRS networks, 3G communication networks, 4G communication networks, and WiFi networks.

In the cloud system architecture shown in FIG. 1, since the user 10 has the usage permission to the storage area 33, and the data of the user 10, the user data of other users, and the execution result are all stored in the storage area 33, the user 10 can copy all the data in the storage area 33, including his/her own data, user data of other users, and execution results; consequently, other users' valuable data may be divulged.

Figure 2:
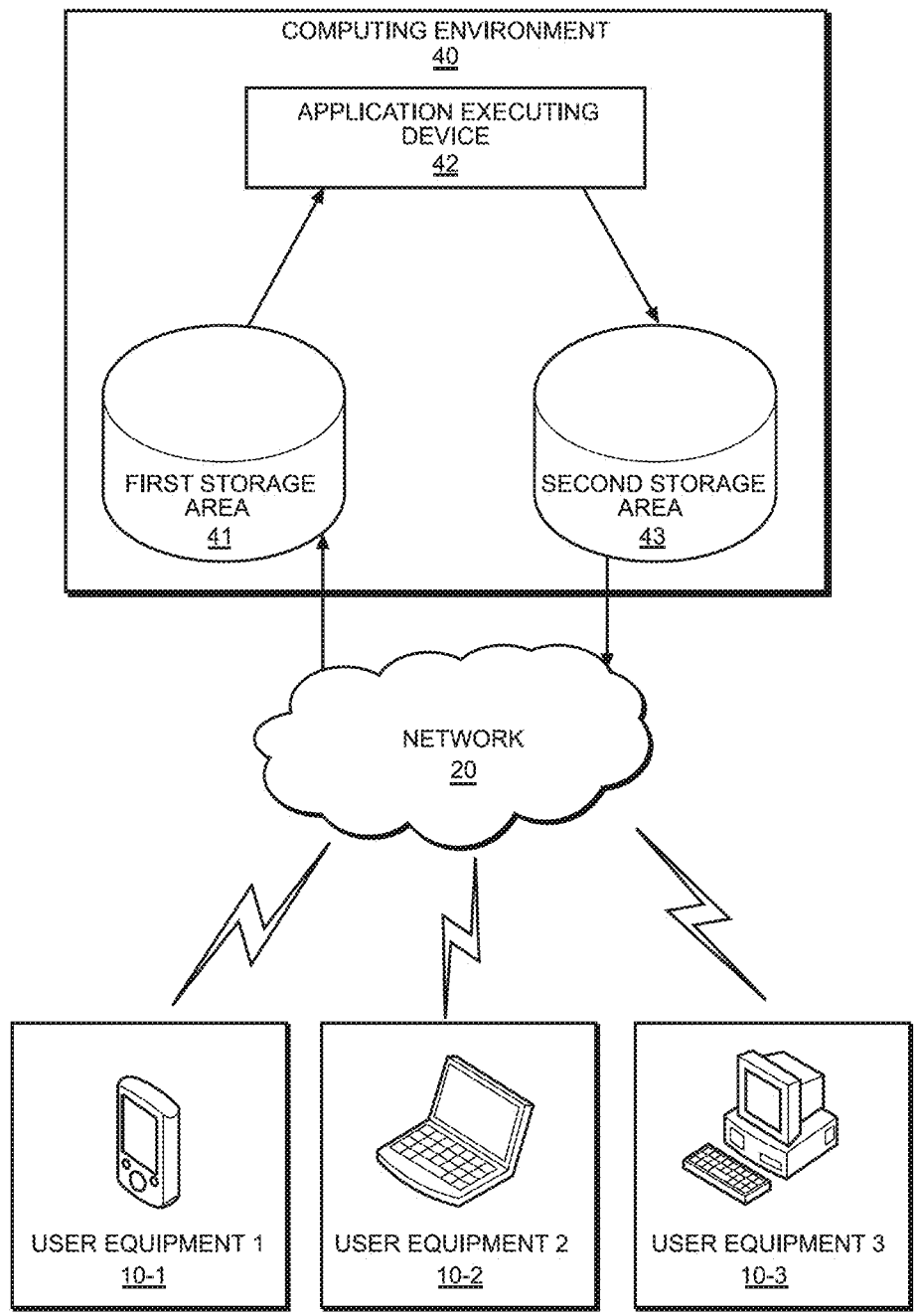
FIG. 2 shows a schematic diagram of an example of the structure of a cloud system of an apparatus for executing an application in a cloud system according to the present application.

FIG. 2 shows a schematic diagram of one example of the structure of a cloud system according to the present application. As shown in FIG. 2, the cloud system comprises a computing environment 40. The computing environment 40 comprises a first storage area 41, a device 42 for executing an application in the cloud system (hereinafter referred to as the application executing device 42) and a second storage area 43. The first storage area 41 is for storing user data input by the first user to initiate an application execution request, and the second storage area 43 is for storing an execution result of the application executing device 42 so that the first user obtains the execution result via the network 20. Similarly, the first user can obtain the execution result from the second storage area 43 of the cloud system by way of active acquisition or passive reception. In the present application, the access permission of the first user to the first storage area 41 is a write-only permission, and the access permission of the first user to the second storage area 43 is a read-only permission. Here, the first storage area 41 and the second storage area 43 may comprise various types of nonvolatile memories and volatile memories as described above.

Figure 3:
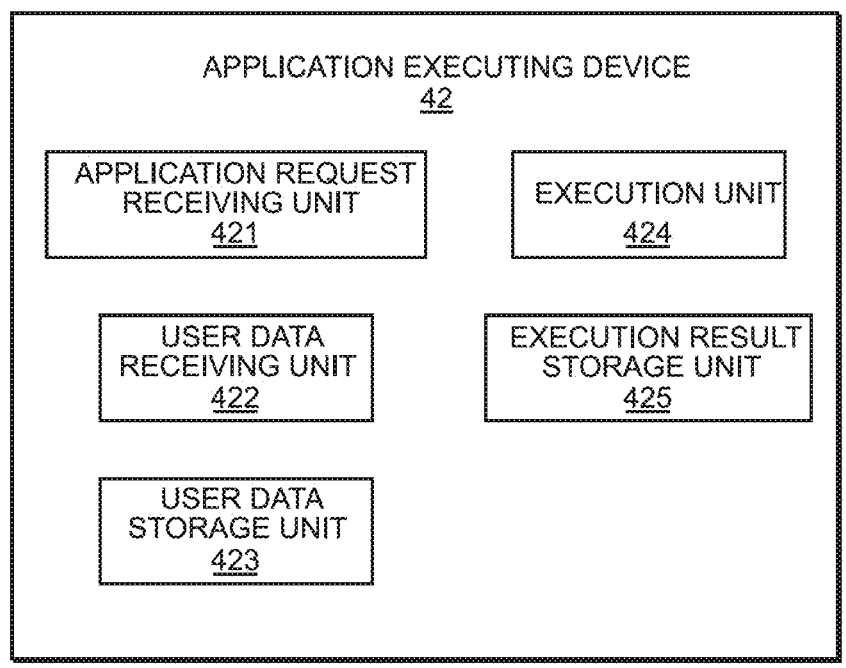
FIG. 3 shows a block diagram of an example of an apparatus for executing an application in a cloud system according to the present application.

FIG. 3 shows a block diagram of one example of the application executing device 42 according to the present application. As shown in FIG. 3, the application executing device 42 comprises an application request receiving unit 421, a user data receiving unit 422, a user data storage unit 423, an executing unit 424, and an execution result storage unit 425. The application request receiving unit 421 is configured to receive a request for executing an application on the cloud system from the first user.

The user data receiving unit 422 is configured to receive, from the first user, user data of the first user related to the execution of the application. The user data storage unit 423 is configured to store the received user data of the first user in the first storage area 41. The executing unit 424 is configured to execute, in the computing environment 40, the requested application based on the stored user data of the first user to obtain an execution result. The execution result storage unit 425 is configured to store the execution result in the second storage area 43 of the computing environment.

Figure 4:
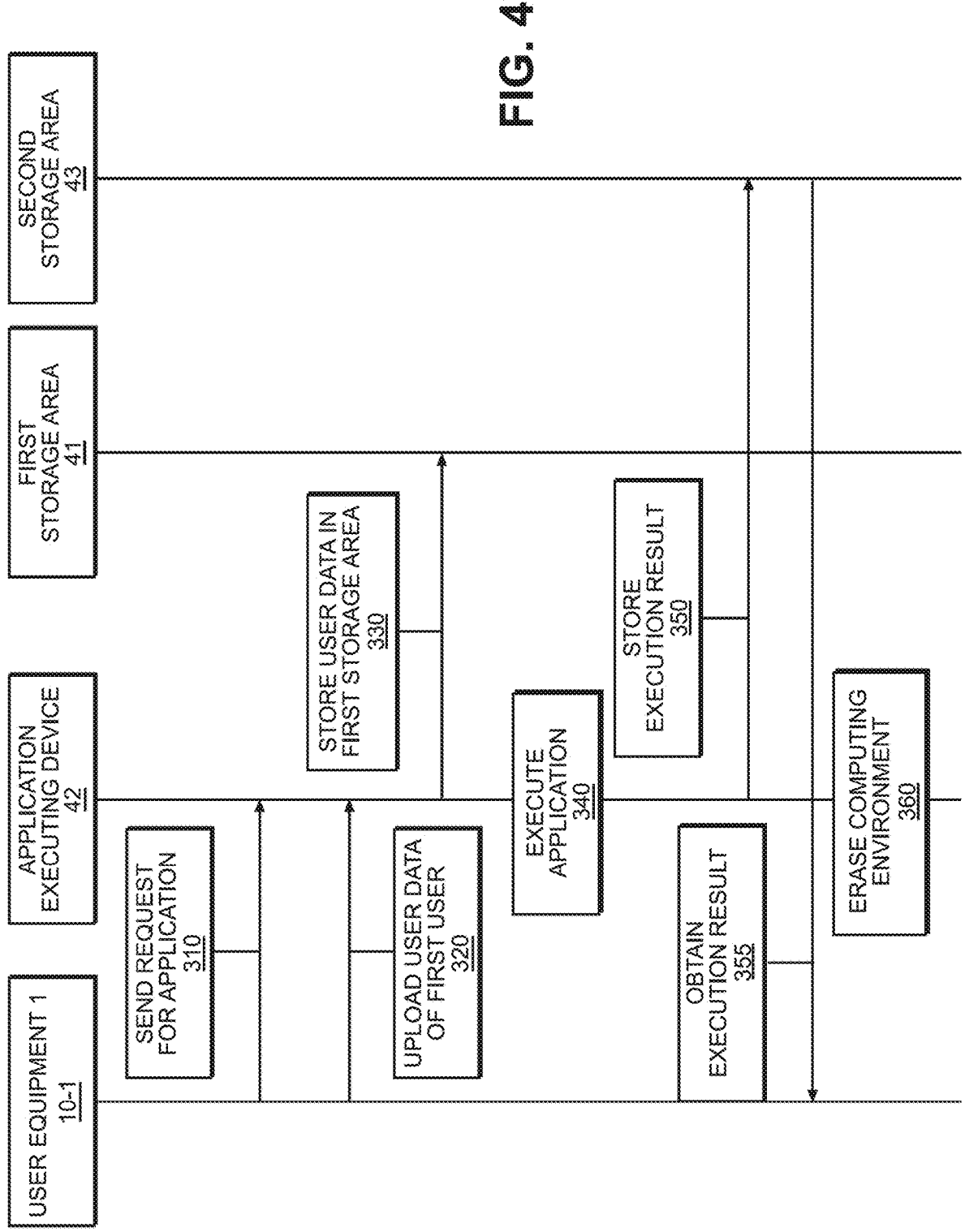
FIG. 4 shows a flowchart of an example of a method for executing an application in a cloud system according to the present application.

FIG. 4 shows a flowchart of an example of a method for executing an application in a cloud system according to the present application. As shown in FIG. 4, while the cloud system is operating, in 310, the application executing device 42 receives a request from the first user (e.g., the mobile phone user 10-1) to execute an application on the cloud system. Here, the request comprises information of the requested application, such as an application name and the like. Moreover, preferably, the request may also comprise information of the requested service and/or information related to requested user data of other users.

Then, in 320, the user data receiving unit 422 in the application executing device 42 receives the user data of the first user related to the execution of the application from the first user 10-1. It is to be noted that the receiving operation of the user data receiving unit 422 may be passively receiving user data of the first user from the first user. For example, in one example, the first user may, together with requests for executing applications on the cloud system, send user data of the first user related to the execution of the application to the application executing device. In another example, the receiving operation of the user data receiving unit 422 may be actively receiving user data of the first user from the first user. For example, after the application request receiving unit 421 receives a request, the first user is sent a message for obtaining the user data of the first user, and then the first user sends the user data of the first user to the cloud system in response to the received message.

After receiving the user data of the first user 10-1, in 330, the user data storage unit 423 stores the received user data of the first user 10-1 in the first storage area 41 of the cloud system. Next, in 340, the executing unit 424 of the application executing device 42 executes the requested application using the stored user data of the first user 10-1 to obtain an execution result. Then, in 350, the execution result storage unit 425 of the application executing device 42 stores the execution result in the second storage area 43 of the computing environment 40 for the first user 10-1 to obtain. The manner in which the first user 10-1 obtains the execution result can be read by, for example, accessing the second storage area 43, or automatically sent to the first user by the cloud system. Preferably, the method may further comprise the step of sending the execution result to the first user in a push manner or in a manner requested by a user.

Moreover, it is to be noted herein that in one example, the computing environment 40 can be a computing environment that is independent of other computing environments in the cloud system. In another example, the computing environment 40 may be a temporary computing environment that is independent of other computing environments in the cloud system. In this case, the application executing device 42 may further comprise a temporary computing environment creating unit for creating a temporary computing environment in the cloud system. Moreover, preferably, the application executing device 42 may further comprise a temporary computing environment releasing unit for releasing the created temporary computing environment after the first user obtains the execution result from the cloud system.

With the above-mentioned solution, a first storage area that is read-only for a user and a second storage area that is write-only for the user are created in a computing environment of the cloud system, after receipt of the user's request for an application in the cloud system, the data submitted by the user is loaded into the first storage area to execute the requested application based on the user data in the computing environment, and the execution result is stored in the second storage area for the user to obtain, so that data privacy protection and security can be provided on the cloud system.

Further, preferably, the application executing device 42 may further comprise an erasing unit (not shown) for erasing the data stored in the first storage area 41 and the second storage area 43 after the execution result is obtained by the first user. In the present example, the erasing unit can erase the user data in the first storage area 41 and the execution result in the second storage area 43. Correspondingly, the method shown in FIG. 4 may further comprise the following step: in 355, the first user obtains an execution result stored in the second storage area 43 from the cloud system. The manner in which the first user 10-1 obtains the execution result can be read by, for example, accessing the second storage area 43, or automatically sent to the first user by the cloud system. Then, in 360, the data stored in the first storage area 41 and the second storage area 43 are erased.

Moreover, preferably, the application executing device 42 may further comprise a sending unit (not shown) for sending an execution result to the first user in a push manner or in a manner requested by the user.

With the above-mentioned solution, after the execution result of the application request for the first user is obtained by the first user, data stored in the first storage area 41 and the second storage area 43 are erased to prevent data related to the execution of the application from being obtained by any other user, thereby more effectively providing data privacy protection and security.

Figure 5:
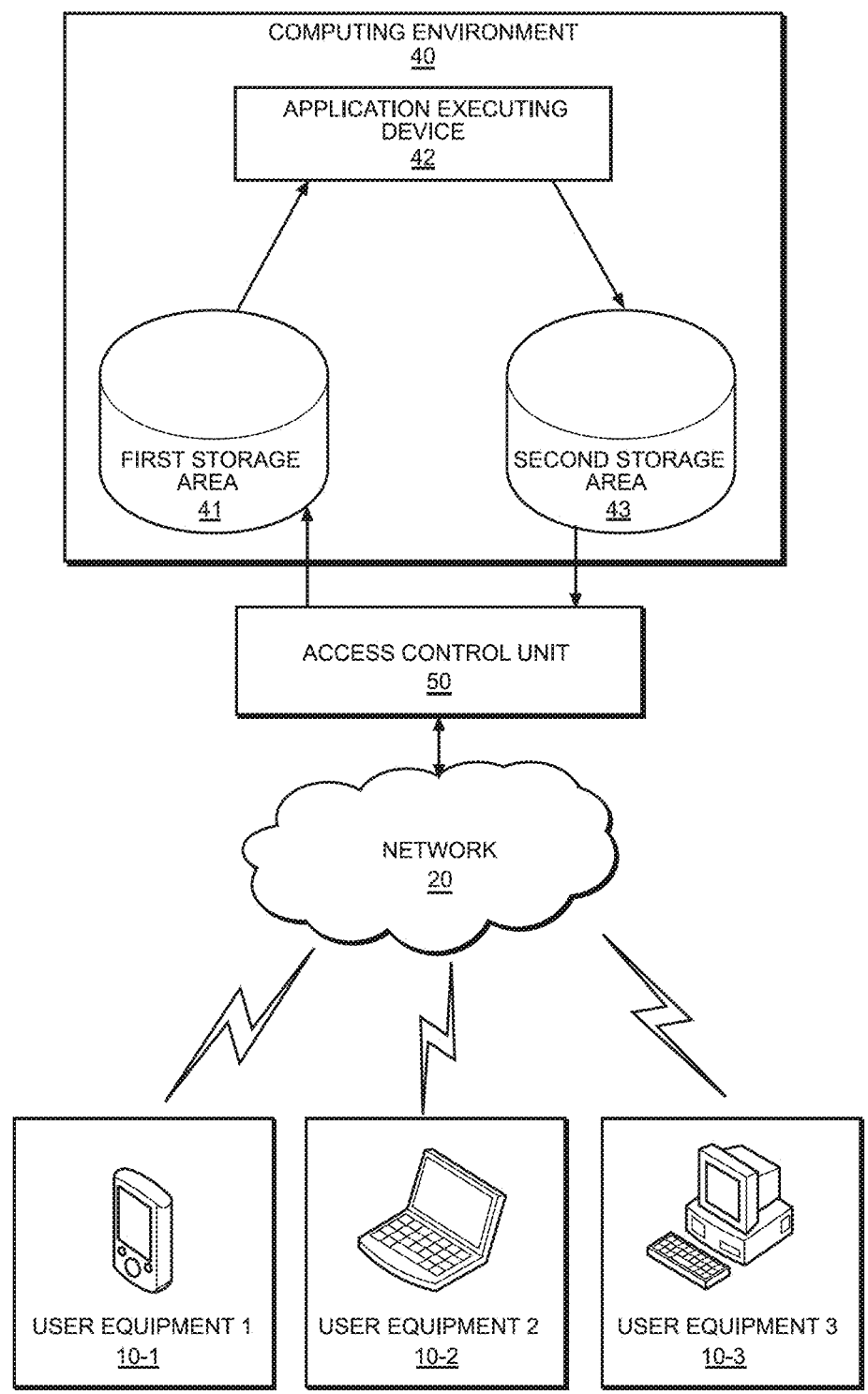
FIG. 5 shows a schematic diagram of an example of the structure of a cloud system of an apparatus for executing an application in a cloud system according to the present application.
Figure 6:
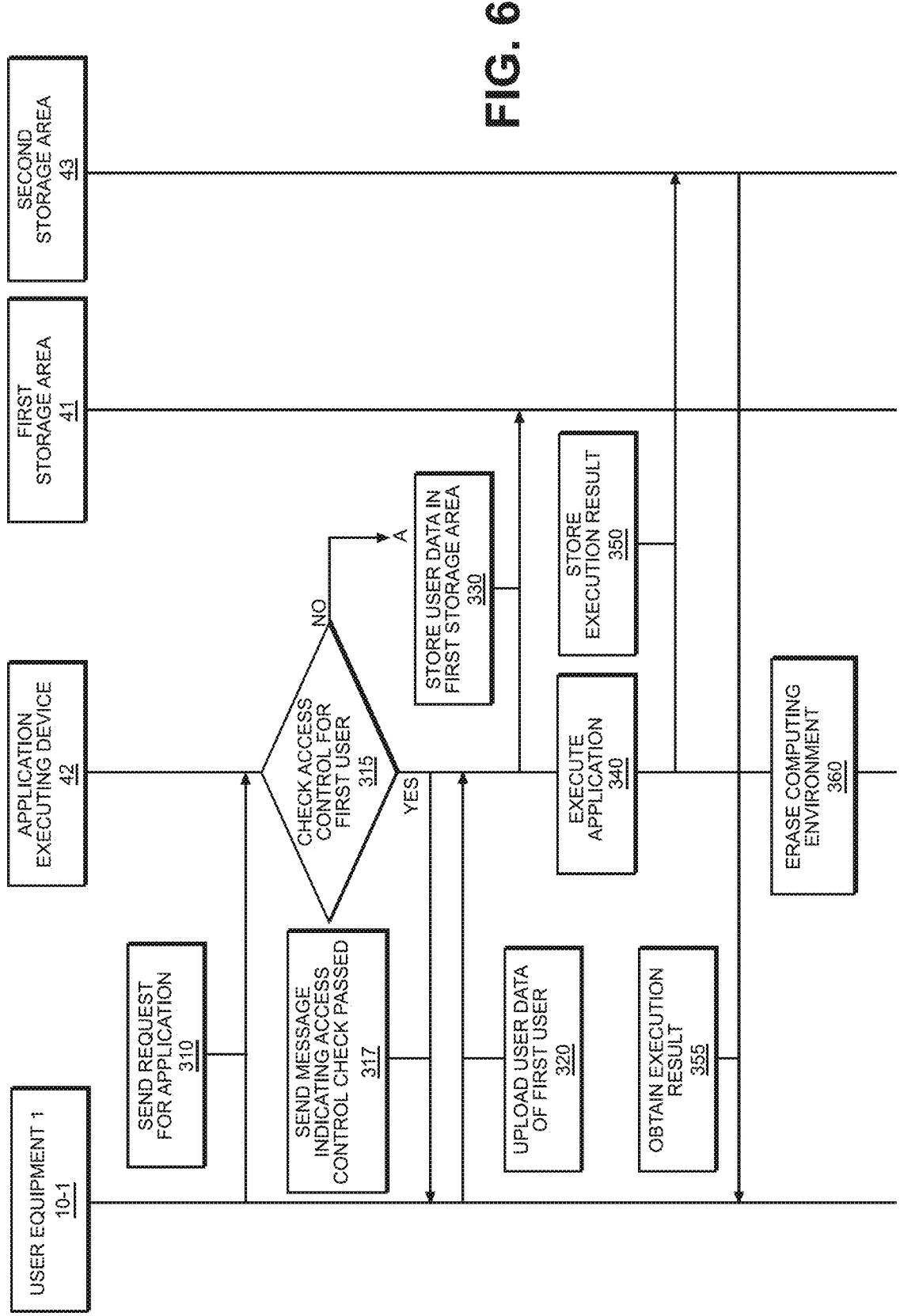
FIG. 6 shows a flowchart of another example of a method for executing an application in a cloud system according to the present application.

FIG. 5 shows a schematic diagram of an example of the structure of a cloud system of an apparatus for executing an application in a cloud system according to the present application. FIG. 6 shows a flowchart of another example of a method for executing an application in a cloud system according to the present application.

FIG. 5 is a modification to an embodiment of the application executing apparatus shown in FIGS. 2 and 3. The difference from the application executing device 42 shown in FIGS. 2 and 3 is that the application executing device further comprises an access control unit 50 and an access control key receiving unit (not shown). In another example of the present application, the access control key may also comprise being sent together in the request. The access control key receiving unit is configured to receive an access control key from the first user after receiving the request of the first user for executing an application on the cloud system. The access control unit 50 is configured to perform an access control check on the first user using the received access control key. Here, the access control unit 50 may be located in the computing environment 40 or may be located outside of the computing environment 40. Further, the access control check can perform authentication using any of the available access control key authentication methods in the art. For example, the access control check may utilize a shared key-based identity authentication algorithm or utilize an MD5-based identity authentication algorithm.

Accordingly, in the method shown in FIG. 6, compared with FIGS. 4, 315 and 317 are added between 310 and 320. In 315, after receiving the request of the first user for executing the application in the cloud system and the access control key, the cloud system performs an access control check on the first user by using the access control key of the first user to determine whether the first user has an access permission to the cloud system. After determining that the first user has an access permission to the cloud system, in 317, a message is sent to the first user indicating that the access control check for the first user has been passed. Then, in 320, the user data of the first user is sent to the user data receiving unit 422 in the application executing device 42. If it is determined that the first user has no access permission to the cloud system, the process ends (i.e., A).

Figure 7:
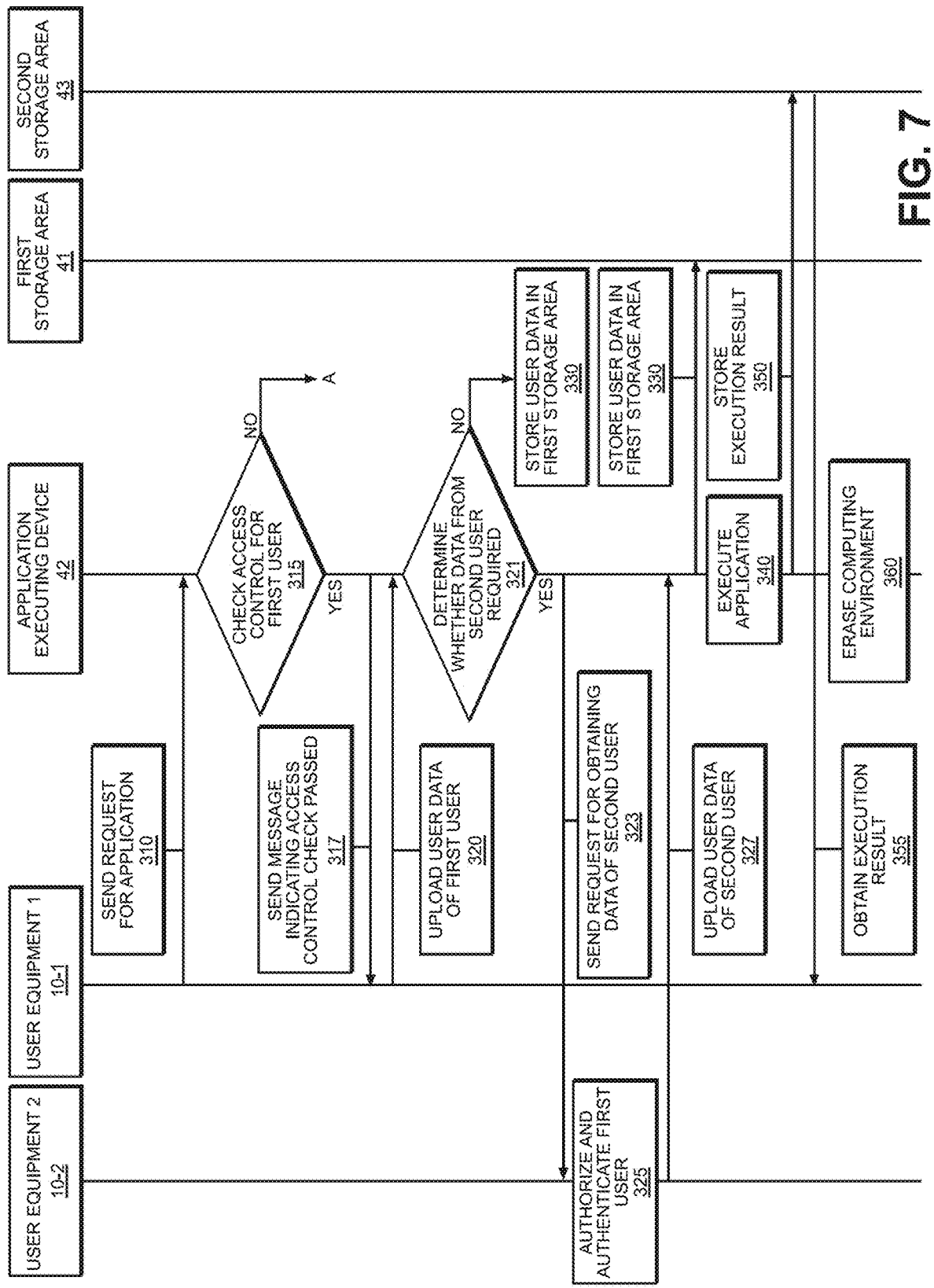
FIG. 7 shows a flowchart of another example of a method for executing an application in a cloud system according to the present application.

FIG. 7 shows a flowchart of another example of a method for executing an application in a cloud system according to the present application. FIG. 7 is a modification to an embodiment of the method shown in FIG. 6. The embodiment shown in FIG. 7 corresponds to a situation where one or more pieces of user data from another user (i.e., the second user) are required for executing an application.

The method shown in FIG. 7 further comprises 321 to 327 as compared with the method shown in FIG. 6. For the sake of brevity, only the differences are described here. After receipt of the user data of the first user from the first user in 320, whether the execution of the application requires user data of the second user is determined in 321, for example, user data of users 10-2 and 10-3 as shown in FIG. 2. Here, in an example, determining whether the execution of the application requires user data of the second user may comprise: determining whether the execution of the application requires user data of the second user based on the attribute information of the application. The attribute information is, for example, information for describing parameters involved in the execution of an application, such as information of a user related to the execution of an application. In another example, the request for executing an application in the cloud system may also comprise user data-related information of other users related to the execution of the requested application. In this case, determining whether the execution of the application requires user data of the second user may comprise: determining whether the execution of the application requires user data of the second user by judging whether the request comprises user data-related information of other users related to the execution of the requested application. The data of the second user may comprise, for example, product data and service data of the service provider of the cloud system, data of the cloud system manufacturer, and user data of other related cloud system users.

If it is determined that the data is required, then in 323, a request to obtain user data of the second user is sent to the second user. Then, in 325, the second user, using an authorization and authentication message from the first user, performs authorization and authentication on the first user for data usage, i.e., verifying whether the first user has the right to access their data. The authorization and authentication message, for example, contains at least information of the first user about users who can be authorized to access the data. The authorization and authentication message may be sent to the second user from the first user in broadcast manner before the second user performs the authorization and authentication, for example, when the first user sends a request for the application execution or when the first user sends the user data of the first user to the cloud system. Alternatively, the authorization and authentication message may be sent from the first user to the second user via the cloud system. For example, the first user sends the authorization and authentication message to the cloud system; upon determining that the user data of the second user is needed, the cloud system sends the authorization and authentication message to the second user.

After the authorization and authentication for the first user is passed, the user data of the second user is sent to the application executing device 42 in 327, and the user data of the first user and the second user are stored in the first storage area in 330. Then, in 340, the requested application is executed using the user data of the first and second users to obtain an execution result. When the authorization and authentication for the first user fails, the process ends.

Here, when the second user comprises a plurality of second users, in one example, in 327, the user data of the second user is sent to the application executing device 42 only after the authorization and authentication for the first user is passed by all the second users. Then, in 340, the application is executed using the received user data of the first user and all the second users. Otherwise, the process ends. In another example, in 327, after the authorization and authentication of some of the second users among the plurality of second users for the first user is passed, the user data of the second users having passed the authorization and authentication may be sent to the application executing device 42. Then, in 340, the application is executed using the received user data of the first user and some of the second users. In addition, the process ends only when the authorization and authentication for the first user by all the second users has failed.

Further, in other examples, in the case where the execution of the application requires user data from the second user, in addition to the cloud system performing an access control check for the first user, preferably, similar to the first user, it may also comprise the cloud system performing an access control check for the second user.

It is to be noted here that the application executing device 42 corresponding to the method shown in FIG. 7 may further comprise a determining unit (not shown) for determining whether the execution of the application requires user data of the second user. Upon determining that the execution of the application requires user data of the second user, the user data receiving unit 422 receives the user data of the second user from the second user, and the user data storage unit 423 stores the received user data of the second user in the first storage area 41.

With the above-mentioned solution, before the first and/or second user submits their own user data to a computing environment, an access control check is performed for the first user and/or the second user to prevent an unauthorized user from submitting malicious data to the computing environment, thereby more effectively providing data privacy protection and security.

Figure 8:
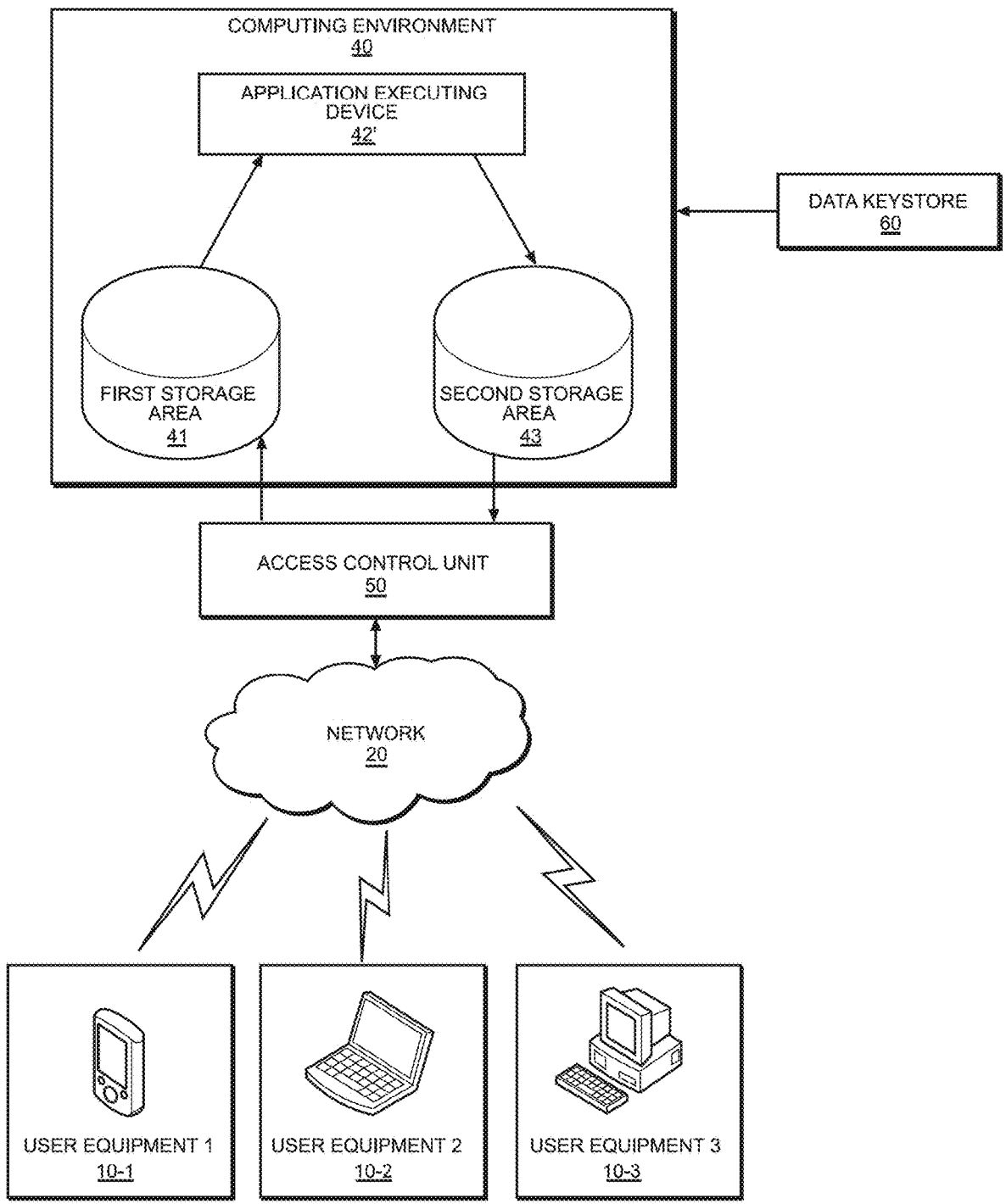
FIG. 8 shows a block diagram of an example of the structure of a cloud system of an apparatus for executing an application in a cloud system according to the present application.
Figure 9:
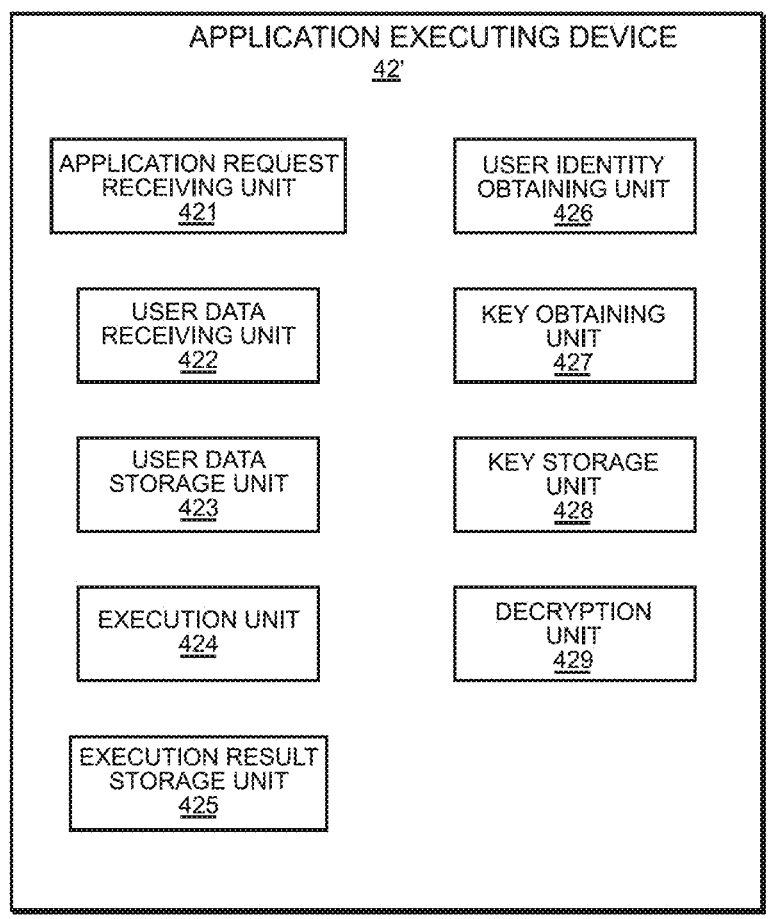
FIG. 9 shows a block diagram of some components of an apparatus for executing an application in a cloud system according to the present application.

FIG. 8 shows a block diagram of an example of the structure of a cloud system of an apparatus for executing an application in a cloud system according to the present application. FIG. 9 shows a block diagram of some components (i.e., 42') of an apparatus for executing an application in a cloud system according to the present application. FIG. 8 is a modification to the embodiment shown in FIG. 5. The embodiment in FIG. 8 corresponds to the fact that the user data of the first user related to the execution of the application submitted to the cloud system is the data encrypted by the first user with a private key in a private key/public key pair of the first user.

Compared with FIG. 5, the apparatus shown in FIG. 8 further comprises a data keystore 60 for storing a public key in the first user's private key/public key pair in association with the user identity of the first user. Further, as shown in FIG. 9, the apparatus 42' in FIG. 8 further comprises a user identity obtaining unit 426, a key obtaining unit 427, a key storage unit 428, and a decryption unit 429. The user identity obtaining unit 426 is configured to obtain the user identity of the first user from the first user. Here, user identity refers to information for uniquely identifying the identity of a user, such as a user ID and a device unique identification code of a terminal device used by a user. The first user may send the user identity information to the application executing device along with the request for executing an application in the cloud system. In one example, the user identity information may also be contained in the request. In addition, the user identification process can also be implemented using other well-known techniques in the art. The key obtaining unit 427 is configured to obtain, from the data keystore 60, the public key in the private key/public key pair of the first user corresponding to the obtained user identity of the first user. The key storage unit 428 is configured to store the obtained public key of the first user in a third storage area of the computing environment 40. The decryption unit 429 is configured to decrypt the received encrypted user data of the first user using the public key of the first user stored in the third storage area. Here, the third storage area is a storage area different from the first and second storage areas, and the access permission thereof is not particularly limited.

Further, preferably, in the example shown in FIG. 8, user data related to the execution of the application can comprise not only user data of the first user encrypted with a private key of the first user's private key/public key pair by the first user but also, the user data of the second user encrypted with a private key of the second user's private key/public key pair by the second user. In this case, the data keystore 60 shown in FIG. 8 is configured to store a public key in a private key/public key pair of the first user in association with a user identity of the first user; and store a public key in a private key/public key pair of the second user in association with a user identity of the second user. The user identity obtaining unit 426 is configured to obtain the user identity of the first user and that of the second user from the first user. The key obtaining unit 427 is configured to obtain, from the data keystore 60, a public key in a private key/public key pair of the first user corresponding to the obtained user identity of the first user, and obtain a public key in a private key/public key pair of the second user corresponding to the obtained user identity of the second user. The key storage unit 428 is configured to store the obtained public key of the first user and the public key of the second user in a third storage area of the computing environment 40. The decryption unit 429 is configured to decrypt the received encrypted user data of the first user using the public key of the first user stored in the third storage area, and decrypt the received the encrypted user data of the second user using the public key of the second user stored in the third storage area. Here, the third storage area is a storage area different from the first and second storage areas, and the access permission thereof is not particularly limited.

Figure 10:
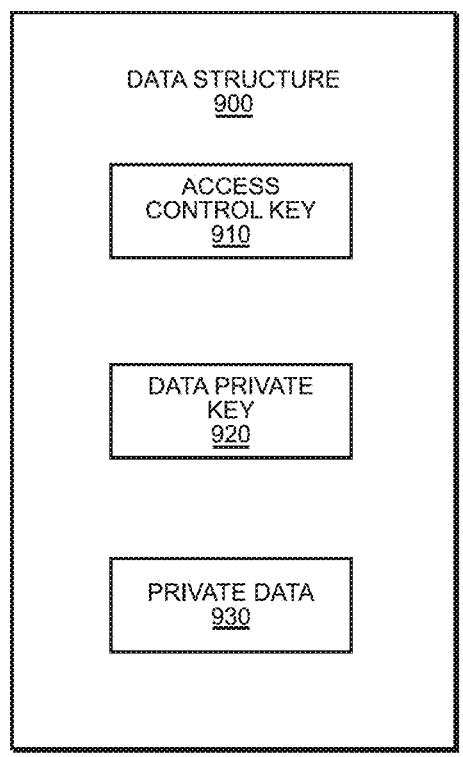
FIG. 10 shows a diagram of an example of a data structure on the user side of the present application.

In the above-mentioned case, in addition to the access control key and the user private data, the first user and/or the second user also have a private key in the private key/public key pair for encrypting user data to be sent to the cloud system. FIG. 10 shows a diagram of an example of a data structure 900 on the user side according to the present application. As shown in FIG. 10, the data on the user side comprises an access control key 910, a data private key 920, and private data 930.

Figure 11:
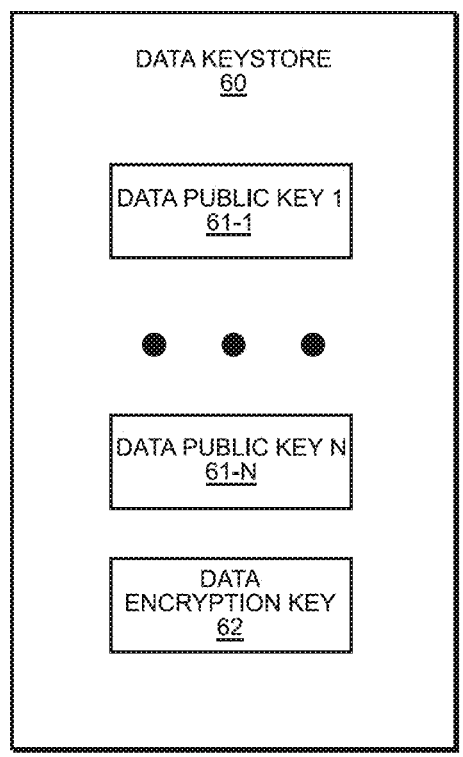
FIG. 11 shows a diagram of the data content in a data keystore according to the present application.

FIG. 11 shows a diagram of data content in a data keystore according to the present application. As shown in FIG. 11, the data keystore 60 may comprise one or more data public keys 61-1, ..., 61-N. The data public keys 61-1, ..., 61-N and the corresponding data private key in the data on the user side constitute a public key/private key pair. Thus, encrypted user data can be decrypted using a public key in the computing environment. In addition, the data keystore 60 may also comprise a data encryption key 62 for encrypting execution results in computing environment 40. In general, the data encryption key 62 can be the same for all users. Preferably, the data encryption key 62 may also be different for each user.

Further, in this embodiment, the authorization and authentication for the first user performed by the second user may be performed on the basis of an authorization and authentication message. The authorization and authentication message is generated by the first user and may comprise an encrypted address of the first user, a public key, a private key signature, and an encrypted address of the second user. As described above, the authorization and authentication message may be sent to the cloud system and then sent by the cloud system to the corresponding second user. Alternatively, the authorization and authentication message may also be broadcast by the first user to a corresponding second user.

Figure 12:
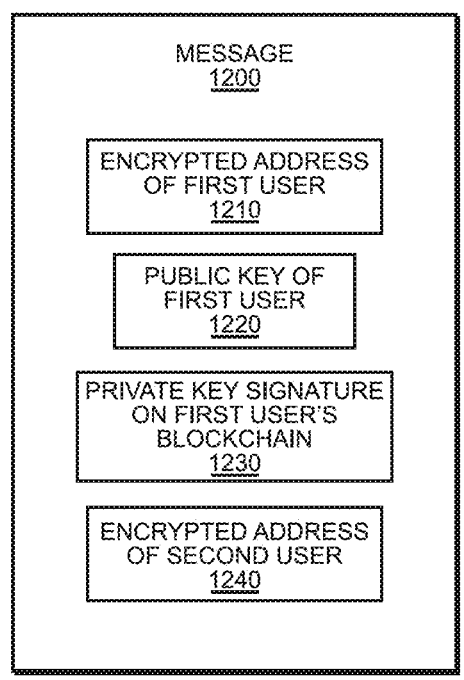
FIG. 12 shows a schematic diagram of a message for performing authentication on a first user according to the present application.

FIG. 12 shows a schematic diagram of an authorization and authentication message 1200 for performing authorization and authentication on a first user according to the present application. As shown in FIG. 12, the authorization and authentication message 1200 may comprise an encrypted address 1210 of the first user, a public key 1220 of the first user, a private key signature 1230 on a blockchain of the first user, and an encrypted address 1240 of the second user. Here, the user's encrypted address refers to an address of the user ultimately obtained by calculating the user's private key and public key using an encryption algorithm.

The authorization and authentication for the first user performed by the second user may comprise: (1) calculating an encrypted address of the first user using the public key of the first user, and then comparing the calculated encrypted address with the encrypted address contained in the authorization and authentication message to check whether they are the same; and (2) decrypting the private key signature on a blockchain of the first user using the public key of the first user in the authorization and authentication message, and comparing the decrypted private key signature with the hash value of the last block on a blockchain of the second user to check whether they are the same. If both the above-mentioned processes are passed; in other words, when the calculated encrypted address is the same as the encrypted address of the first user contained in the authorization and authentication message and the decrypted private key signature is the same as the hash value of the last block on the blockchain of the second user, then the authorization and authentication on the first user has been passed is confirmed. Otherwise, the authorization and authentication is deemed to have failed.

Moreover, preferably, the data keystore 60 may also comprise a data encryption key 62. In this case, the key obtaining unit 427 obtains the data encryption key from the data keystore 60, and the key storage unit may also store the data encryption key in the fourth storage area of the computing environment 40; in addition, the application executing apparatus may further comprise an encryption unit (not shown) for encrypting an execution result by using the data encryption key stored in the fourth storage area in the computing environment 40. Then, the encrypted execution result is stored in the second storage area 43. Here, the fourth storage area is a storage area different from the first and second storage areas, and the access permission thereof is not particularly limited. In one example, the third storage area may be the same storage area as the fourth storage area.

Figure 13:
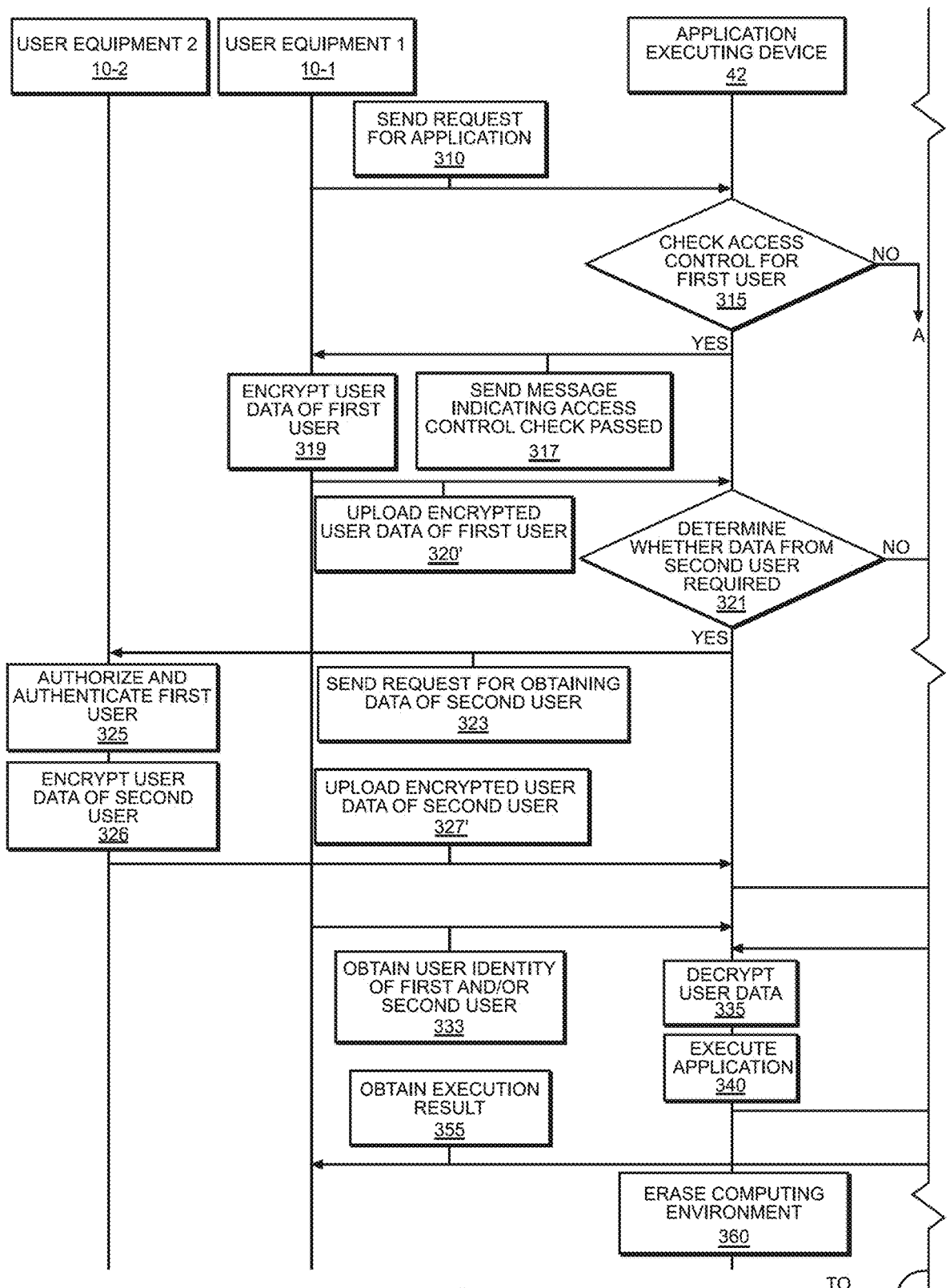
FIG. 13 shows a flowchart of another example of a method for executing an application in a cloud system according to the present application.
Figure 13:
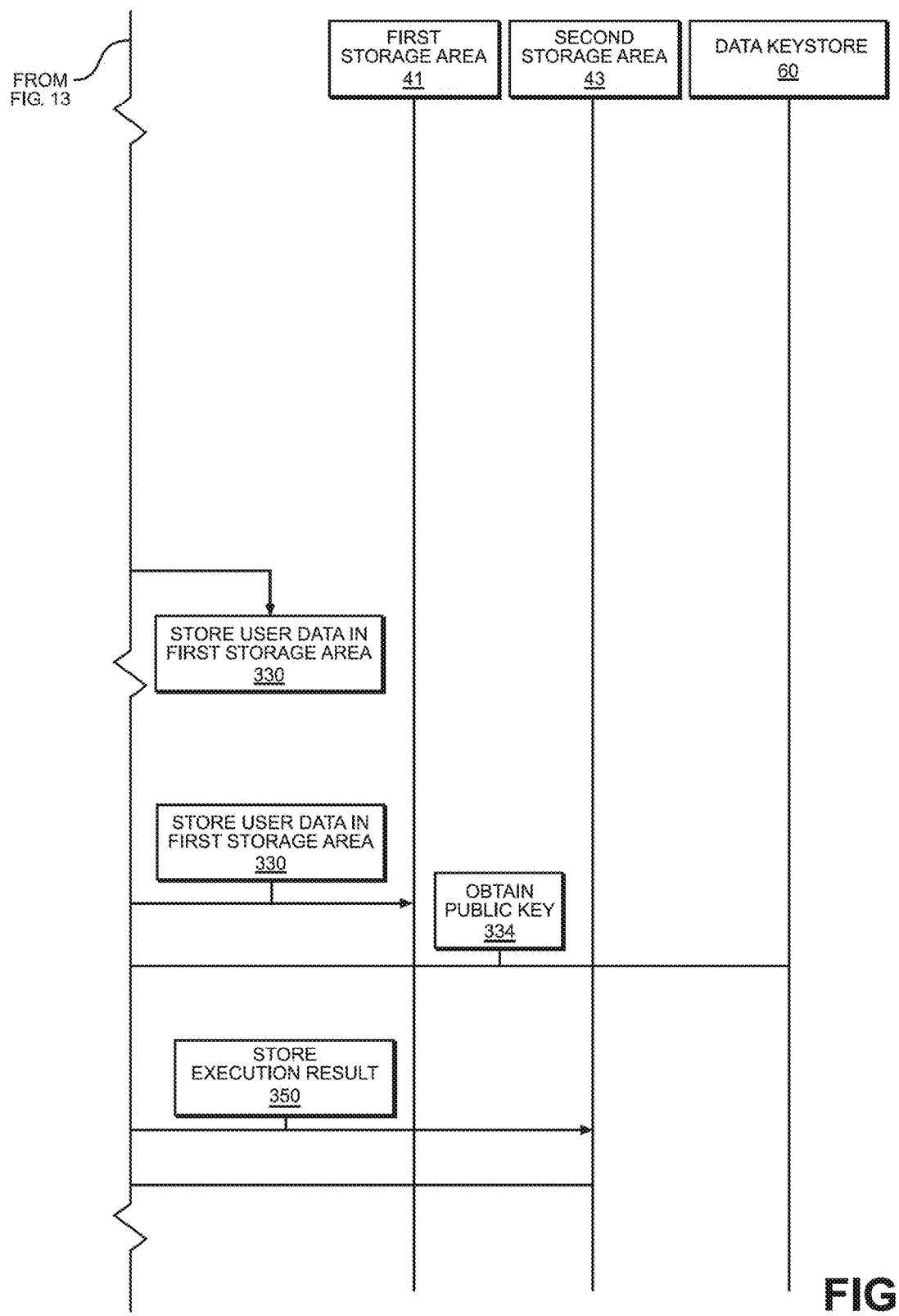

FIG. 13 shows a flowchart of another example of a method for executing an application in a cloud system according to the present application. The embodiment in FIG. 13 is a modification to the embodiment shown in FIG. 7. The difference from FIG. 7 is that the embodiment in FIG. 13 may further comprise 319, 326, 333, 334, and 335, and corresponding modifications are performed for 320 and 327. Other steps are exactly the same as those in FIG. 7, and will not be described again here.

Specifically, in 319, the user data of the first user is encrypted by the first user with the private key in the first user's private/public key pair. Then, in 320', the user data encrypted with the first user's private key is sent to the application executing device 42.

In 326, the user data of the second user is encrypted by the second user with the private key in the private key/public key pair of the second user. Then, in 327', the user data encrypted with the first user's private key is sent to the application executing device 42.

In 333, the user identity of the first user and/or that of the second user is obtained from the first user. After the user identity of the first user and/or that of the second user is obtained, in 334, the public key is obtained from the data keystore 60 using the user identity of the first user and/or that of the second user, and the public key of the first user and/or that of the second user in the data keystore 60 is stored in a third storage area of the computing environment 40. Next, in 335, the encrypted user data of the first user and/or the second user is decrypted using the public key of the first user and/or that of the second user in the third storage area. Then, in 340, the application is executed using the decrypted user data of the first user and/or that of the second user.

Further, preferably, in the example shown in FIG. 13, after 340, the method may further comprise: obtaining a data encryption key from the data keystore 60, storing the data encryption key in a fourth storage area of the computing environment 40, and, in the computing environment 40, encrypting the execution result using the data encryption key stored in the fourth storage area. Then, in 350, the encrypted execution result is stored in the second storage area 43.

Figure 14:
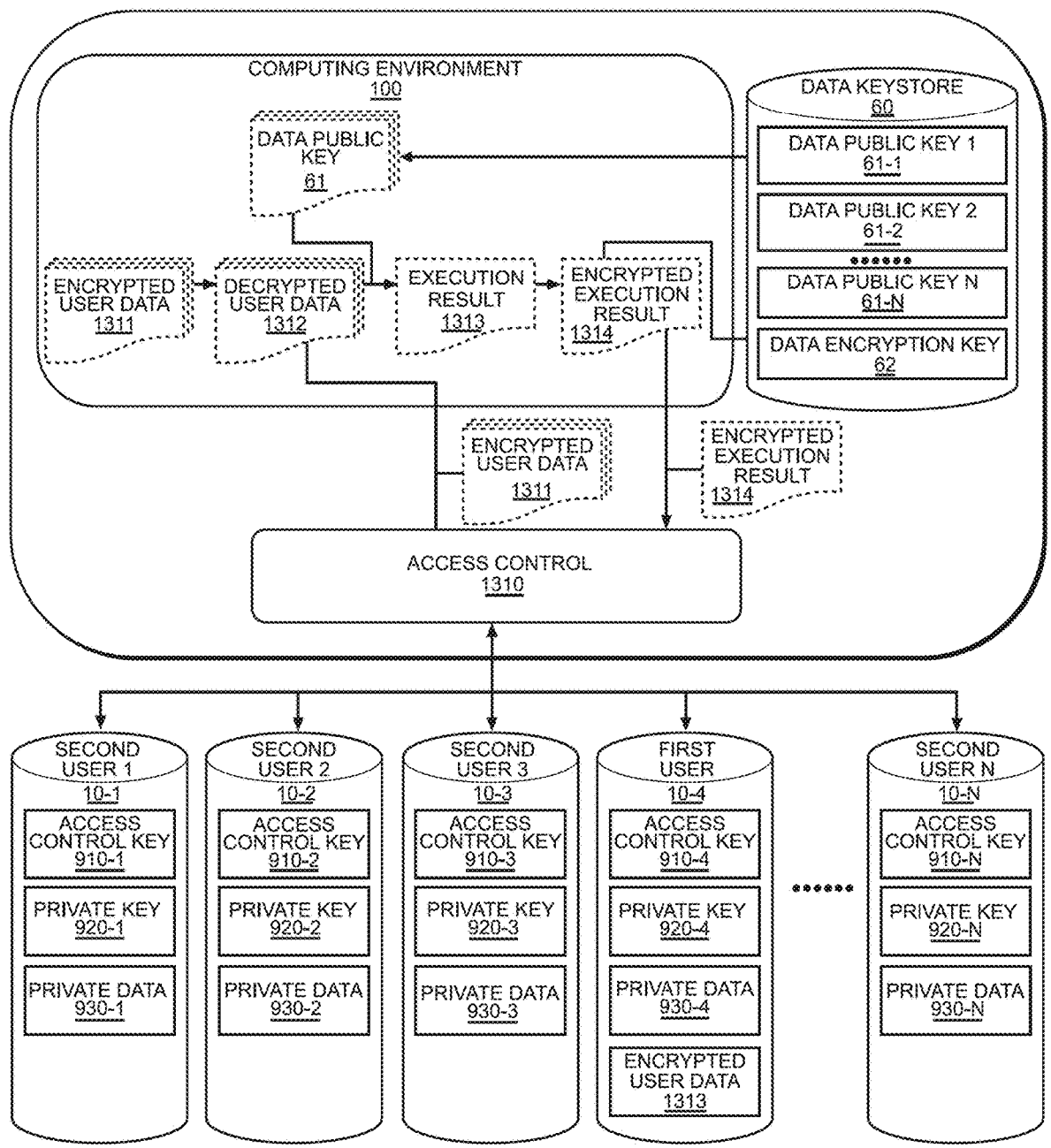
FIG. 14 shows a diagram of an implementation of a method for executing an application in a cloud system according to the present application.

FIG. 14 shows a diagram of an implementation of a method for executing an application in a cloud system according to the present application.

N users 10-1, 10-2, 10-3, 10-4, and 10-N are shown in FIG. 14, wherein N is a natural number greater than or equal to 5. Here, the user 10-4 is the first user in this document, and the other users are the second users. The user 10-4 sends a request for an application to the cloud system, the request containing the access control key 910-4 of the user 10-4. After the cloud system performs an access control check 1310 using the access control key 910-4 and the check is passed, the user 10-4 encrypts the private data 930-4 with the private key 920-4, and the encrypted user data 1311 of the first user is stored in the first storage area. Meanwhile, authorization and authentication for the first user is performed on other users (second users) required for the execution of the application. In addition, after the second users pass the authorization and authentication for the first user, at the second user, the user data of the second user to be sent to and stored in the first storage area is encrypted by using the private key of the user, and then the encrypted user data is stored in the first storage area.

Next, in the computing environment 40, decryption is performed for the user data for each user using the corresponding data public key loaded from the data keystore 60. Then, in the computing environment 40, the requested application is executed using the decrypted user data, the execution result is encrypted using the data encryption key loaded from the data keystore, and the encrypted execution result is stored in the second storage area for the first user to obtain. Further, after the encrypted execution result is obtained by the first user, the user data in the first storage area and the execution in the second storage area in the computing environment are erased. In addition, the data public key and the data encryption key loaded in the computing environment can be erased.

Moreover, a method and apparatus according to the present application can be implemented using one or more processors and memories. A memory stores computer-executable instructions which, when executed, cause the one or more processors to be used for: receiving a request from a first user for executing an application in the cloud system; receiving, from the first user, user data of the first user related to the execution of the requested application; storing the received user data in a first storage area 41 of the computing environment 40 of the cloud system; in the computing environment 40, executing the requested application based on the stored user data of the first user to obtain an execution result; and storing the execution result in a second storage area 43 of the computing environment 40, wherein the access permission of the first user to the first storage area 41 is a write-only permission, and the access permission of the first user to the second storage area 43 is a read-only permission.

It should be understood that computer-executable instructions stored in a memory, when executed, cause one or more processors to perform the various operations and functions described in the various embodiments of the present application.

In addition, the present application also discloses a cloud system, comprising: a computing environment comprising a first storage area for storing user data input by a user and a second storage area for storing an execution result of the application, wherein the access permission of the user to the first storage area is a write-only permission, and the access permission of the user to the second storage area is a read-only permission; and an apparatus for executing an application in a cloud system as described above.

The examples described above in connection with the drawings illustrate exemplary embodiments, but do not represent all embodiments that can be implemented or fall within the scope of protection of the claims. The term "exemplary" is used throughout the Specification to mean "serving as an example, instance, or exemplification" and does not mean that it is "preferred" or "advantageous" over other embodiments. Specific embodiments contain specific details for the purpose of providing an understanding of the described techniques. However, these techniques can be implemented without these specific details. In some instances, well-known structures and devices are shown as block diagrams in order to avoid obscuring the concepts of the described embodiments.

The above description of the disclosure is provided to enable any person of ordinary skill in the art to implement or use the present disclosure. Various modifications to the present disclosure will be readily apparent to those of ordinary skill in the art, and general principles defined herein may be applied to other variations without departing from the scope of the disclosure. Therefore, the present disclosure is not limited to the examples or designs described herein, but is consistent with the broadest scope defined by the principles and novel features disclosed herein.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for executing an application in a cloud system, the method comprising:
   receiving a request for executing the application in the cloud system;
   receiving user data of a first user related to execution of the application;
   storing the user data of the first user in a first storage area of a computing environment of the cloud system;
   determining whether executing the application requires user data of a second user;
   performing authorization and authentication on the first user for data usage using an authorization and authentication message including an encrypted address of the first user, a public key, a private key signature on a blockchain of the first user, and an encrypted address of the second user, wherein the performing authorization and authentication on the first user for data usage using an authorization and authentication message includes
      calculating an encrypted address of the first user by using a public key of the first user in the authorization and authentication message,
      decrypting the private key signature on the blockchain of the first user using the public key, and
      confirming that the authorization and authentication on the first user for data usage has been passed in response to determining that the calculated encrypted address is the same as the encrypted address of the first user contained in the authorization and authentication message and determining that the decrypted private key signature is the same as a hash value of a last block on a blockchain of the second user;
   receiving the user data of the second user;
   executing the application in the computing environment based on the user data of the first user and the user data of the second user to obtain an execution result; and
   storing the execution result in a second storage area of the computing environment, wherein, access permission of the first user to the first storage area is a write-only permission, and wherein access permission of the first user to the second storage area is a read-only permission.

2. The method of claim 1, further comprising:
   erasing data stored in the first storage area and the second storage area after obtaining the execution result.

3. The method of claim 1, further comprising:
   receiving an access control key of the first user;
   performing an access control check on the first user using the access control key of the first user; and
   receiving user data of the first user related to the executing the application in response to a successful access control check.

4. The method of claim 1, wherein access permission of the second user to the first storage area is a write-only permission, and access permission of the second user to the second storage area is a read-only permission;
   wherein the receiving the user data of the second user includes receiving the user data of the second user from the second user in response to determining that the executing the application requires the user data of the second user; and where in the method further includes storing the user data of the second user in the first storage area.

5. The method of claim 1, wherein the determining whether the executing the application requires user data of the second user comprises:
   determining whether the executing the application requires user data of the second user based on attribute information of the application.

6. The method of claim 1, wherein the authorization and authentication message is sent from the first user to the second user in a broadcast manner, or the authorization and authentication message is sent from the first user to the second user via the cloud system.

7. The method of claim 1, wherein
   the user data of the first user is data encrypted by the first user with a private key in a private key/public key pair of the first user, and a public key of the first user is stored in a data keystore of the cloud system in association with a user identity of the first user, and
   wherein the method further includes,
      obtaining a user identity of the first user from the first user,
      obtaining, from the data keystore, the public key of the first user,
      storing the public key of the first user in a third storage area in the computing environment, and
      decrypting, in the computing environment, the encrypted user data of the first user using the public key of the first user stored in the third storage area.

8. The method of claim 4, wherein the user data of the first user is data encrypted by the first user with a private key in a private key/public key pair of the first user, user data of the second user is data encrypted by the second user with a private key in a private key/public key pair of the second user, a public key of the first user is stored in a data keystore of the cloud system in association with a user identity of the first user, a public key of the second user is stored in the data key store of the cloud system in association with the user identity of the second user, and
   wherein the method further includes,
      obtaining a user identity of the first user and a user identity of the second user from the first user,
      obtaining, from the data keystore, the public key of the first user corresponding to the user identity of the first user, and obtaining, from the data keystore, the public key of the second user corresponding to the user identity of the second user,
      storing the public key of the first user and the public key of the second user in a third storage area of the computing environment, and
   decrypting, in the computing environment, the encrypted user data of the first user and the encrypted user data of the second user using the public key of the first user and the public key of the second user stored in the third storage area.

9. The method of claim 1, further comprising:
   storing a data encryption key in a data keystore of the cloud system in a third storage area of the computing environment, wherein, in the computing environment, the execution result is encrypted using the data encryption key stored in the third storage area before storing the execution result in the second storage area.

10. The method of claim 1, further comprising:
    sending the execution result to the first user in push manner or in a manner requested by a user.

11. The method of claim 2, further comprising:
    receiving an access control key of the first user;
    performing an access control check on the first user using the access control key of the first user; and
    receiving the user data of the first user related to the executing of the application in response to a successful access control check.

12. The method of claim 2,
    wherein access permission of the second user to the first storage area is a write-only permission, and access permission of the second user to the second storage area is a read-only permission.

13. The method of claim 12, wherein the determining whether the executing the application requires user data of the second user comprises:
    determining whether the executing the application requires user data of the second user based on attribute information of the application.

14. The method of claim 2, wherein
    the user data of the first user is data encrypted with a private key in a private key/public key pair of the first user, and a public key of the first user is stored in a data keystore of the cloud system in association with a user identity of the first user, and
    wherein the method further includes,
       obtaining a user identity of the first user,
       obtaining, from the data keystore, the public key of the first user,
       storing the public key of the first user in a third storage area in the computing environment, and
       decrypting, in the computing environment, the encrypted user data of the first user using the public key of the first user stored in the third storage area.

15. The method of claim 2, further comprising:
    storing a data encryption key in a data keystore of the cloud system in a third storage area of the computing environment, wherein, in the computing environment, the execution result is encrypted using the data encryption key stored in the third storage area before storing the execution result in the second storage area.

16. The method of claim 2, further comprising:
    sending the execution result to the first user in push manner or in a manner requested by a user.

17. An apparatus for executing an application in a cloud system, the apparatus comprising:
    processing circuitry configured to cause the apparatus to,
       receive a request to execute the application in the cloud system,
       receive user data of a first user related to executing the application,
       store the user data of the first user in a first storage area of a computing environment of the cloud system,
       determine whether executing the application requires user data of a second user,
       perform authorization and authentication on the first user for data usage using an authorization and authentication message including an encrypted address of the first user, a public key, a private key signature on a blockchain of the first user, and an encrypted address of the second user, the authorization and authentication including
          calculating an encrypted address of the first user by using a public key of the first user in the authorization and authentication message, decrypting the private key signature on the blockchain of the first user using the public key, and
confirming that the authorization and authentication on the first user for data usage has been passed in response to determining that the calculated encrypted address is the same as the encrypted address of the first user contained in the authorization and authentication message and determining that the decrypted private key signature is the same as a hash value of a last block on a blockchain of the second user;
receive the user data of the second user;
execute the application in the computing environment based on the user data of the first user and the user data of the second user to obtain an execution result, and
store the execution result in a second storage area of the computing environment, wherein, access permission of the first user to the first storage area is a write-only permission, and access permission of the first user to the second storage area is a read-only permission.

18. The apparatus as claimed in claim 17, wherein the processing circuitry is configured to cause the apparatus to:
erase data stored in the first storage area and the second storage area after transmitting the execution result.

19. The apparatus of claim 17, wherein the processing circuitry is configured to cause the apparatus to:
receive an access control key of the first user;
perform an access control check on the first user using the access control key of the first user; and
receive user data of the first user related to the executing the application in response to a successful access control check.

20. The apparatus of claim 17,
wherein access permission of the second user to the first storage area is a write-only permission, and access permission of the second user to the second storage area is a read-only permission.

21. The apparatus as claimed in claim 17, wherein the processing circuitry is configured to cause the apparatus to:
determine whether execution of the application requires user data of the second user based on attribute information of the application.

22. The apparatus as claimed in claim 17, wherein, user data of the first user related to execution of the application is data encrypted with a private key in a private key/public key pair of the first user, and
the processing circuitry is configured to cause the apparatus to
store a public key in a private key/public key pair of the first user in association with a user identity of the first user in a data keystore,
obtain the user identity of the first user,
obtain the public key of the first user corresponding to the user identity of the first user from the data keystore,
store the public key of the first user in a third storage area of the computing environment, and
decrypt, in the computing environment, the encrypted user data of the first user using the public key of the first user stored in the third storage area.

23. The apparatus as claimed in claim 20, wherein, the user data of the first user is data encrypted with a private key in a private key/public key pair of the first user, and the user data of the second user is data encrypted with a private key in a private key/public key pair of the second user, and the processing circuitry is configured to cause the apparatus to
store, in a data keystore, a public key in the private key/public key pair of the first user in association with a user identity of the first user,
store, in the data keystore, a public key in the private key/public key pair of the second user in association with a user identity of the second user,
obtain the user identity of the first user and second user from the first user,
obtain the public key of the first user corresponding to the user identity of the first user and the public key of the second user corresponding to the obtained user identity of the second user from the data keystore,
store the public key of the first user and the public key of the second user in a third storage area of the computing environment, and
decrypt the encrypted user data of the first user and encrypted user data of the second user by using the public key of the first user and the public key of the second user stored in the third storage area.

24. The apparatus of claim 22, wherein, the data keystore includes a data encryption key, and
the processing circuitry is configured to cause the apparatus to
store the data encryption key in the data keystore in a fourth storage area of the computing environment, and
encrypt, in the computing environment, the execution result using the data encryption key stored in the fourth storage area before storing the execution result in the second storage area.

25. The apparatus of claim 17, wherein the processing circuitry is configured to cause the apparatus to:
send the execution result to the first user in a push manner or in a manner requested by a user.

26. A cloud system comprising:
the apparatus of claim 17.

27. The apparatus of claim 18, wherein the processing circuitry is configured to cause the apparatus to:
receive an access control key of the first user;
perform an access control check on the first user using the access control key of the first user; and
receive user data of the first user related to the executing the application in response to a successful access control check.

28. The apparatus of claim 17, wherein the processing circuitry is configured to cause the apparatus to:
store a data encryption key in a data keystore in a third storage area of the computing environment; and
encrypt the execution result using the data encryption key before storing the execution result in the second storage area.

29. The apparatus of claim 18, wherein the processing circuitry is configured to cause the apparatus to:
store a data encryption key in a data keystore in a third storage area of the computing environment; and
encrypt the execution result using the data encryption key before storing the execution result in the second storage area.

30. The apparatus of claim 18, wherein the processing circuitry is configured to cause the apparatus to:
send the execution result to the first user in a push manner or in a manner requested by a user.

31. A computing device comprising:
one or more processors; and
a memory for storing instructions that, when executed by the one or more processors, cause the computing device to
receive a request for executing an application in a cloud system,
receive user data of a first user related to executing the application,
store the user data of the first user in a first storage area of a computing environment of the cloud system,
determine whether executing the application requires user data of a second user,
perform authorization and authentication on the first user for data usage using an authorization and authentication message including an encrypted address of the first user, a public key, a private key signature on a blockchain of the first user, and an encrypted address of the second user, the authorization and authentication on the first user including
calculating an encrypted address of the first user by using a public key of the first user in the authorization and authentication message,
decrypting the private key signature on the blockchain of the first user using the public key, and
confirming that the authorization and authentication on the first user for data usage has been passed in response to determining that the calculated encrypted address is the same as the encrypted address of the first user contained in the authorization and authentication message and determining that the decrypted private key signature is the same as a hash value of a last block on a blockchain of the second user;
receive the user data of the second user;
execute the application in the computing environment based on the user data of the first user and the user data of the second user to obtain an execution result, and
store the execution result in a second storage area of the computing environment, wherein, access permission of the first user to the first storage area is a write-only permission, and access permission of the first user to the second storage area is a read-only permission.

* * * * *